United States Patent
Franke et al.

(10) Patent No.: US 11,269,800 B2
(45) Date of Patent: Mar. 8, 2022

(54) INTEGRATED COMMUNICATION UNIT

(71) Applicant: PORT INDUSTRIAL AUTOMATION GMBH, Halle A. D. Saale (DE)

(72) Inventors: Dietmar Franke, Halle A. D. Saale (DE); Christian Bornschein, Halle A. D. Saale (DE); Marcus Tangermann, Halle A. D. Saale (DE)

(73) Assignee: Port Industrial Automation GmbH, Halle A.D. Saale (DE)

( * ) Notice: Subject to any disclaimer, the term of this patent is extended or adjusted under 35 U.S.C. 154(b) by 0 days.

(21) Appl. No.: 16/971,978

(22) PCT Filed: Feb. 6, 2019

(86) PCT No.: PCT/DE2019/000026
§ 371 (c)(1),
(2) Date: Aug. 21, 2020

(87) PCT Pub. No.: WO2019/161820
PCT Pub. Date: Aug. 29, 2019

(65) Prior Publication Data
US 2020/0409897 A1    Dec. 31, 2020

(30) Foreign Application Priority Data

Feb. 22, 2018    (DE) .............. 102018001420
Feb. 22, 2018    (DE) .............. 202018000941

(51) Int. Cl.
*G06F 13/36*    (2006.01)
*G06F 13/40*    (2006.01)
(Continued)

(52) U.S. Cl.
CPC ...... *G06F 13/4027* (2013.01); *G06F 13/4282* (2013.01); *G16Y 20/20* (2020.01)

(58) Field of Classification Search
None
See application file for complete search history.

(56) References Cited

U.S. PATENT DOCUMENTS 7,852,873 B2 * 12/2010 Bird ................ H04L 41/24
                                                    370/463
2005/0114710 A1   5/2005 Cornell et al.
(Continued)

FOREIGN PATENT DOCUMENTS

CA        2654466 A1   12/2007
CN     204009971 U     12/2014
(Continued)

*Primary Examiner* — Henry Tsai
*Assistant Examiner* — Dean Phan
(74) *Attorney, Agent, or Firm* — Laurence A. Greenberg; Werner H. Stemer; Ralph E. Locher

(57) ABSTRACT

An integrated communication unit includes a motherboard, at least one RJ45 interface and an SPI. The motherboard includes a microcontroller that has a middleware. The RJ45 interface provides a cable-based connection to an external control unit. The SPI interface couples to a further SPI interface of an application unit. The SPI interface is configured for receiving application data of the application unit and provides the application data to the microcontroller by transmission. The microcontroller is configured to process the application data and provide the application data to an external control unit via the RJ45 interface. The integrated communication unit is configured to be mounted on a printed circuit board of the application unit by THT or SMT.

4 Claims, 4 Drawing Sheets

Figure 1:
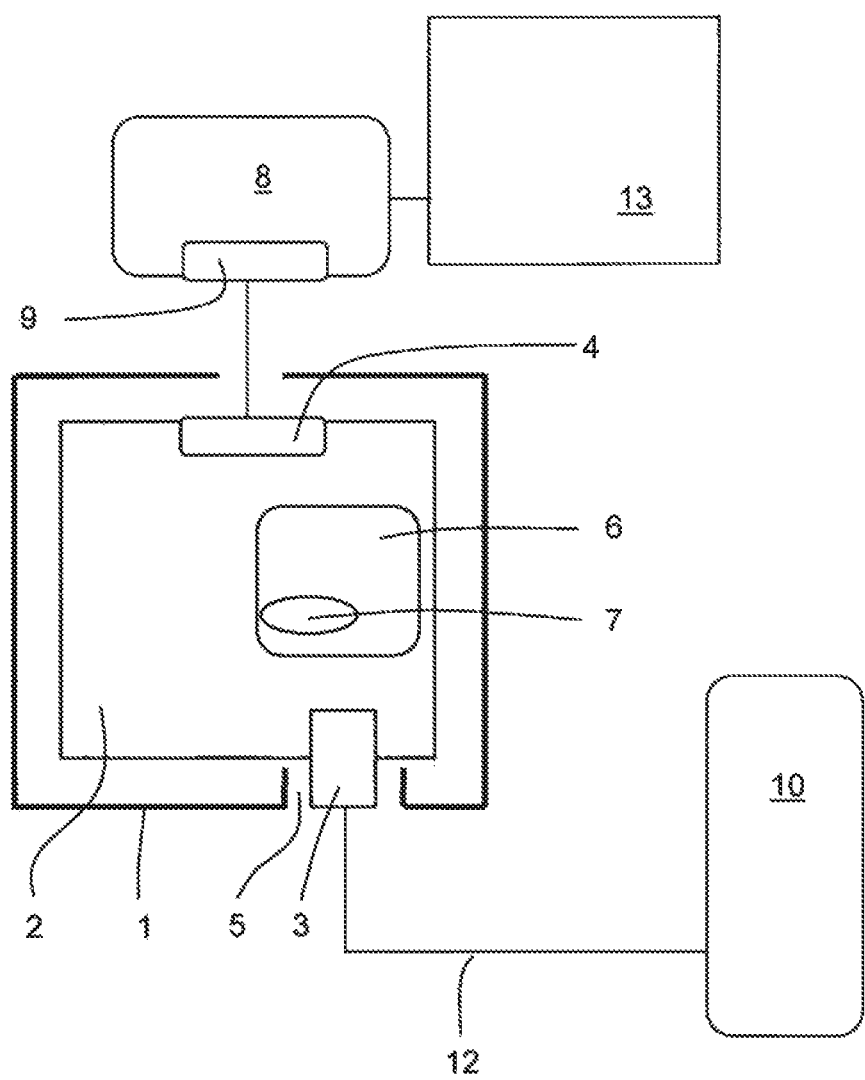

(51) Int. Cl.
*G06F 13/42* (2006.01)
*G16Y 20/20* (2020.01)

(56) References Cited

U.S. PATENT DOCUMENTS

| | | | |
|---|---|---|---|
| 2005/0181643 A1* | 8/2005 | Brower | H04L 67/02 |
| | | | 439/76.1 |
| 2006/0156054 A1* | 7/2006 | Brown | H04L 41/00 |
| | | | 714/4.1 |
| 2007/0300150 A1 | 12/2007 | Davis | |
| 2014/0351611 A1 | 11/2014 | Kim et al. | |
| 2017/0040737 A1 | 2/2017 | Kim et al. | |

FOREIGN PATENT DOCUMENTS

| | | |
|---|---|---|
| CN | 104852845 A | 8/2015 |
| CN | 106951386 A | 7/2017 |
| EP | 3057240 A2 | 8/2016 |
| WO | 2007149669 A2 | 12/2007 |

* cited by examiner

INTEGRATED COMMUNICATION UNIT

BACKGROUND OF THE INVENTION

Field of the Invention

The invention relates to an integrated communication unit by means of which a connection of industrial applications and devices to the "Internet of Things" (IoT) can be provided.

The term "Internet of Things" means the integration of physical and virtual objects in a universal digital network so that the objects can communicate and act autonomously via the Internet. In the industrial range of application, IoT thus enables more cost and time efficient production processes and a sustainable quality management.

From the state of the art, several options are known for networking industrial applications and devices.

The publication US 2017/0040737 A1 describes an industrial network module that can be mounted on and dismounted from an actuator module. In this publication, the actuator module comprises a driver, a controller and a decelerator. The network module has a housing with a large number of through holes and a communication module which is embedded in the housing.

The communication module comprises two control boards, a first connection by means of which a current signal of an external device can be transmitted to the first control board, a second connection by means of which a control signal of the external device can be transmitted to the first control board, and a third connection by means of which the control signal of the external device can be applied to the actuator module. The second connection is designed as a pluggable screw connection, D-subminiature, USB, RJ45, BNC, or M12. The control signal of the external device is provided via the industrial network which can be CANopen, CC-Link, PROFIBUS, EtherCAT, PROFINET or DeviceNet.

Furthermore, the publication WO 2007/149669 A2 discloses a module which has a file on a first data memory containing a data code and which has a firmware image on a second data memory, with the image containing a web application. In addition, the module comprises a first interface adapted to data reception and a processor which assigns the received data to the data code, executes the web application and interacts with an external software to render at least a part of the web page by including the data.

Moreover, the publication CN 104852845 A describes an intelligent IoT gateway. The gateway has a processor which is electrically connected to a data preprocessing unit, a middleware processor unit, a multi-protocol processor unit, and an initialization interface. By means of the gateway, the data entered can be pre-processed using the appropriate data specification, pre-processed intermediate data and results can be stored, and the cache can be made available for data waiting for communication channel distribution. Since the gateway takes over numerous data preprocessing and data decoding tasks, the load on the network shall be considerably reduced, the transmission efficiency shall be improved and, consequently, the load on the server shall also be reduced.

SUMMARY OF THE INVENTION

The task of this invention is to provide a solution which enables the connection of industrial applications and devices to the Internet of Things, which can be used for a large number of different applications and devices, which can be integrated into an existing system in a space-saving manner with little layout and development effort, which is compatible with different field bus systems and enables the integration of a large number of protocols, and which, moreover, can be produced at low costs.

The task is solved by the features specified in the first independent claim as well as alternatively by the features listed in the further independent claim. A preferred further embodiment results from the dependent claims.

The integrated communication unit according to the invention shows a solution in which especially field devices or other applications can be integrated into a communication system with low effort and high reliability. This is based on the fact that in particular field devices, such as units for recording operating conditions, other sensors and actuators, are increasingly connected with applications and a host CPU is always used for this task. The applications with host CPUs are hereinafter referred to as application units.

For this purpose, the integrated communication unit has a housing, a motherboard, at least one RJ45 interface and an SPI interface as basic elements.

The housing is designed in such a manner that the motherboard and the RJ45 interface are accommodated in the housing. Furthermore, the housing has at least one opening. The height and width of the opening correspond to the RJ45 standard. RJ45 is to be understood as the standardized plug connection for telecommunication cabling known from the state of the art, wherein the standardization refers both to the design and the contact assignment. The at least one RJ45 interface is preferably designed as a socket.

The motherboard has a microcontroller. This microcontroller has a middleware.

The SPI interface of the integrated communication unit is set up in such a manner that it can be coupled with a further SPI interface of an application unit. The SPI interface of the application unit and the application unit are not part of the communication unit according to this invention. In the sense of this patent application, the fact that the SPI interface of the integrated communication unit is set up for the coupling with an SPI interface of an application unit is understood such that it can be coupled both logically and physically with such an SPI interface. Preferably, the physical coupling is established via a multi-pin strip, hereinafter also referred to as a pin header which is to be soldered on.

An SPI interface is a serial peripheral interface, i.e. an interface for a synchronous serial data bus by means of which digital circuits can be interconnected.

The SPI interface of the integrated communication unit is configured in such a manner that it is capable to receive application data from the application unit and transmit them to the microcontroller.

Furthermore, the application data can then be processed by the microcontroller. The processed application data can be provided to an external control unit via the RJ45 interface. For this purpose, a cable-based connection to an external control unit can be established via the RJ45 interface. The external control unit is also not part of the communication unit according to the invention. The external control unit can preferably be a PLC unit (programmable logic controller).

In addition, the integrated communication unit is designed in such a way that it can be mounted on a printed circuit board by means of THT (through hole technology) or SMT (surface mounted technology).

The components of the integrated communication unit according to the invention interact, for example, as follows:

From the field device, e.g. a sensor, for example analog electrical signals are transmitted to the application unit and converted into digital signals by the application unit. These digital signals are transmitted to the SPI interface of the integrated communication unit via the SPI interface of the application unit. For the purpose of this invention, these transmitted digital signals are the application data. Within the integrated communication unit, the application data are further transmitted to the microcontroller with its middleware and further processed there. As a result, the data are provided in the standard of a field bus protocol so that they can be transmitted via the RJ45 interface and thus be received and evaluated by a PLC unit, for example. The further processed data from the integrated communication unit are physically output via an RJ45 plug connection, preferably an RJ45 socket.

Vice versa, the integrated communication unit is additionally capable to receive field bus protocols of, for example, a PLC unit via its RJ45 interface. After their transmission to the microcontroller with its middleware, the field bus protocols are processed in such a way that digital data, e.g. command data, are provided as a result and after their transmission to the SPI interface, the SPI interface transmits these data further to the SPI interface of the application unit. Then, the application unit is capable to convert these command data into such control signals the format of which corresponds to the respective field device, e.g. a servomotor, and then have a corresponding action performed by the field device.

In these processes, the integrated communication module operates in a real-time capable manner.

The according to the state of the art otherwise required field bus protocol processing executed by the application unit, and there by a host processor, is taken over by the integrated communication unit. Surprisingly, it was found that the following two effects are simultaneously produced with relatively low device-related effort by using the communication unit according to the invention:

Firstly, a very high amount of load is removed from the application unit so that significantly less resources have to be used there, particularly with respect to processor performance, main memory, flash and possibly provided external components.

Secondly, adaptations of the application unit to the applied field bus system are largely no longer necessary, since the integrated communication unit is already designed in such a way that it is capable to both identify and process the different field bus systems such as CANopen, PROFINET, EthernetIP, POWERLINK, EtherCAT, and that at its SPI interface the data format to be transmitted and received is independent of the field bus system.

This solution has the advantage that also smaller application units can be enabled to function as communication participants by using the communication unit according to the invention; this would not be possible otherwise. Smaller application units are application units for which the host CPU, hereinafter also referred to as the host processor, or the main memory has such low resources that a direct connection to a field bus is not possible.

A further particular advantage is the modularity of the integrated communication unit according to the invention. The modularity is provided both as a physical modularity and as a functional modularity. Physical modularity means that the integrated communication module is a self-contained component group that can be electrically connected to an application unit at the SPI interface of this unit and mechanically to the circuit board of this unit. Functional modularity means that all processes for converting the data from the application unit into the field bus protocols and vice versa run in the integrated communication unit and that the integrated communication unit behaves in an application-neutral manner outward via the SPI interface on the application side and in a field bus-neutral manner via the RJ45 interface on the field bus side.

Due to the application neutrality and field bus neutrality, application units or field devices for which the integrated communication unit can be used can therefore be, in particular, all automation devices, sensors, actuators, gateways, small control systems, PLC units, provided that their host processor has an SPI interface.

In an alternative solution according to a second embodiment, the integrated communication unit has a motherboard, at least one RJ45 interface and an SPI interface as basic elements, wherein the motherboard has a microcontroller and wherein the microcontroller has a middleware, wherein a cable-based connection to an external control unit can be provided by the RJ45 interface, wherein the SPI interface can be coupled to an additional SPI interface of an application unit, wherein application data of the application unit can be received by the SPI interface and can be provided to the microcontroller by transmission, and wherein the application data can be processed by the microcontroller and can be provided to an external control unit by means of the RJ45 interface, and wherein the integrated communication unit can be mounted on a printed circuit board by means of THT (through hole technology) or SMT (surface-mounted technology).

The solution according to the second embodiment differs from the solution described in the first embodiment in that the integrated communication unit is designed without a housing. For all other features and their interaction and advantages, the description sections of the first embodiment apply accordingly to the solution according to the second embodiment.

In an advantageous further embodiment, the integrated communication unit has a further RJ45 interface. The RJ45 interface and the further RJ45 interface, collectively referred to as RJ45 interfaces, are designed to establish a series connection of an external control unit or a further integrated communication unit to the integrated communication unit.

In a physical design of the field bus cabling, the further embodiment advantageously enables the connection of the integrated communication unit as a series connection in a chain, in the following also called daisy chain.

Thus, the integrated communication unit can be universally arranged in a daisy chain. It is possible to connect an external control unit to one of the two RJ45 interfaces and an additional communication unit to the other of the two RJ45 interfaces. However, it is also possible to connect an additional integrated communication unit to each of the two RJ45 interfaces. Finally, it is also possible that only one of the two RJ45 interfaces is connected to an external control unit and the other RJ45 interface is not occupied.

Hereinafter, the integrated communication unit according to this further embodiment is also referred to as the 2-port module, and the integrated communication unit in its basic design with only one RJ45 interface is also referred to as the 1-port module.

The invention is described as an embodiment in more detail by means of the following figures:

BRIEF DESCRIPTION OF THE SEVERAL
VIEWS OF THE DRAWING

FIG. 1 schematic representation of an integrated communication unit with one RJ45 interface (1-port module)

Figure 2:
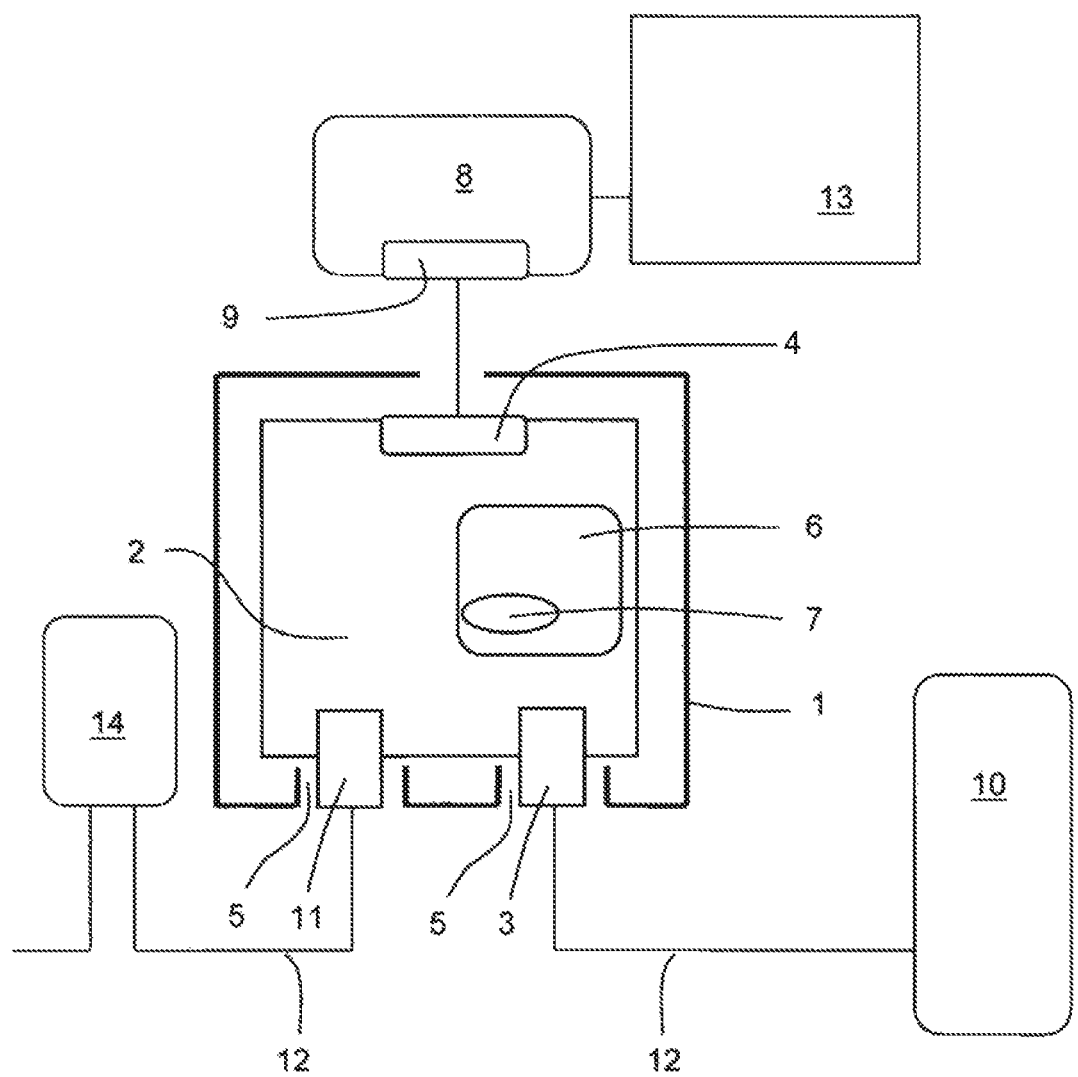

FIG. 2 schematic representation of an integrated communication unit with two RJ45 interfaces (2-port module)

Figure 3:
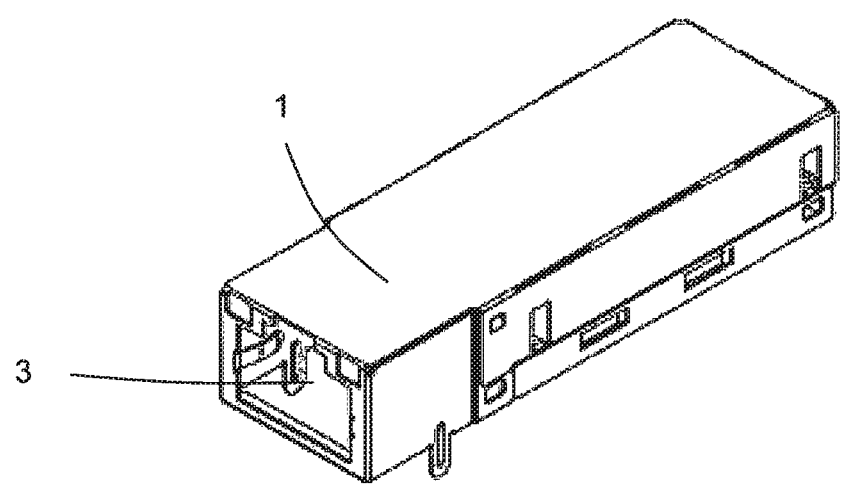

FIG. 3 perspective view of a design of the integrated communication unit with one RJ45 interface (1-port module)

Figure 4:
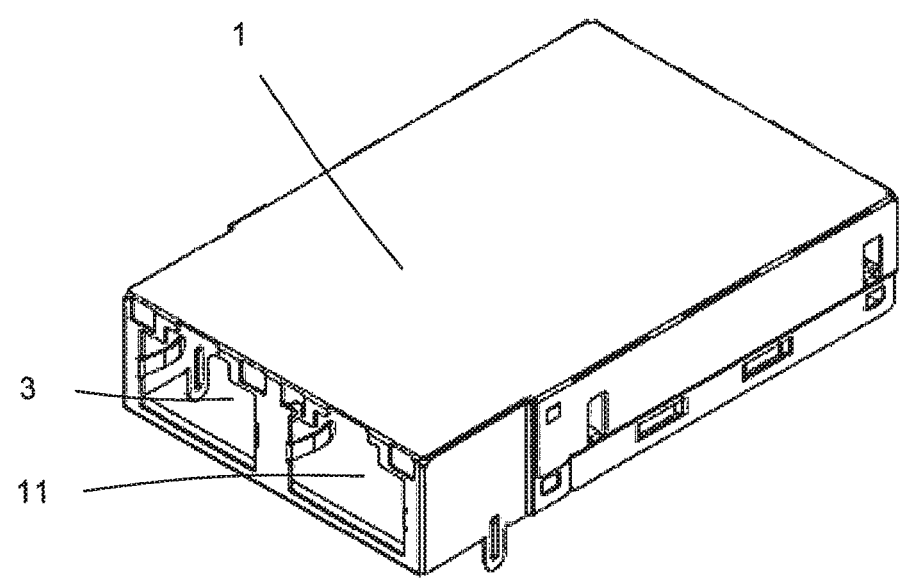

FIG. 4 perspective view of a design of the integrated communication unit with two RJ45 interfaces (2-port module)

Figure 5:
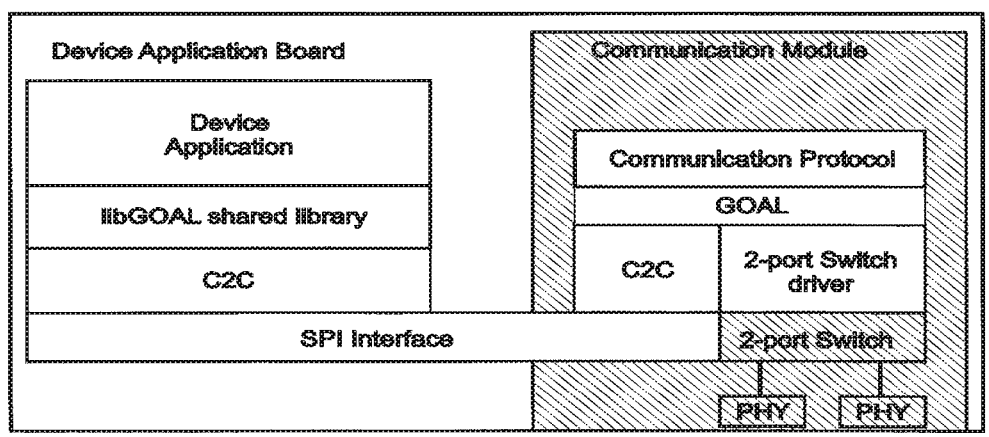

FIG. 5 block diagram (2-port module)

DETAILED DESCRIPTION OF THE INVENTION

In the embodiment shown in FIG. 1, the integrated communication unit has only one RJ45 interface 3. It is a 1-port module.

FIG. 1 shows the arrangement of the integrated communication unit between an application unit 8 and an external control unit 10. In this embodiment, a field device 13, in this case a sensor, is connected to the application unit 8. The sensor transmits analog signals to the application unit 8 there they are further processed into digital signals.

As shown in FIG. 1, the basic structure of the integrated communication unit comprises a housing 1 with an opening 5, wherein in this embodiment the housing 1 is a sheet metal cutting-and-bending part. A motherboard 2 is accommodated in the housing 1 and carries a microcontroller 6 as a single-chip computer system. The microcontroller 6 has a software layer as a middleware 7. In the embodiment, the middleware 7 is an execution layer in which functions of the field bus protocol are prepared by a software and implemented by the protocol stack. Raw data from the application unit 8 are also received here. The following processes are performed by the middleware 7.

For the connection on the field bus side, the integrated communication module of the embodiment has an RJ45 interface 3, designed as an RJ45 socket, by means of which field bus protocols can be received from or transmitted to the field bus line 12. The size and shape of the opening 5 of the housing 1 are adapted to the RJ45 socket. In the embodiment, the field bus line 12 is star-wired. The field bus line 12 leads to an external control unit 10 which is a PLC unit in this embodiment.

On the application side, the integrated communication module has an SPI interface 4. In the embodiment shown, this interface is physically also located on the motherboard 2. Moreover, the SPI interface 4 is functionally also connected to an SPI interface 9 of the application unit 8 in the embodiment. The electrical connection is established via a pin-header.

The application unit 8 with its SPI interface 9, the field device 13, the field bus line 12 and the external control unit 10 are not part of the integrated communication unit; however, they are shown in FIG. 1 in their interaction with the integrated communication unit.

FIG. 2 illustrates another embodiment in which the integrated communication module has two RJ45 interfaces. It is a 2-port module. In the basic structure, the embodiment according to FIG. 2 corresponds to the embodiment according to FIG. 1 so that initially the same reference numerals and explanations apply as to FIG. 1.

The embodiment according to FIG. 2 differs from the embodiment shown in FIG. 1 in that it has a further RJ45 interface 11 in addition to the RJ45 interface 3. An opening 5 in the housing 1 is provided for this further RJ45 interface 11, too. Both RJ45 interfaces 3, 11 are designed as RJ45 sockets. In the integrated communication module according to the embodiment in FIG. 2, both RJ45 interfaces can be assigned via a field bus line 12. In the embodiment, the RJ45 interface 3 is connected to the external control unit 10 and the further RJ45 interface 11 is connected to a further communication participant 14. In the embodiment, the further communication participant 14 is a further integrated communication module. The integrated communication module according to FIG. 2 is designed in such a manner that any other communication participants 14 can also be connected, provided that they are field bus capable. The connection to the external control unit 10 and to the further communication participant 14 is made via the field bus line 12 which is designed as a daisy chain wiring. Analogous to FIG. 1, it also applies to FIG. 2 that the further communication participant 14 is just like the application unit 8 with its SPI interface 9, the field device 13, the field bus line 12 and the external control unit 10 not part of the integrated communication unit and that they are shown in FIG. 2, however, in their interaction with the integrated communication unit.

FIG. 3 and FIG. 4 represent embodiments of the integrated communication unit in their structural design. Both FIG. 3 and FIG. 4 show the housing 1 and the RJ45 interface which is designed as an RJ45 socket. In addition, FIG. 4 shows the further RJ45 interface 11 which is also designed as an RJ45 socket.

FIG. 5 shows a block diagram of an embodiment as a 2-port module.

The block diagrams according to FIG. 5 illustrates an embodiment in which the interaction of the components of the integrated communication unit with the components of the application unit are shown.

"Communication Module" refers to the integrated communication unit, and "Device Application Board" refers to the application unit.

"Device Application" refers to the application software of the application unit which, among other actions, transmits data to the integrated communication unit or, conversely, receives data from it.

"libGOAL shared library" refers to a root library which is delivered as a source code to the application unit and enables the application unit to transmit data to the integrated communication unit as easily as possible.

"C2C" and "C2C" stand for core-to-core communication—one part of this C2C module runs on the CPU of the application unit, the other part in the integrated communication unit. The user of the application unit does not have to or should not change this setting. Both the libGOAL shared library and C2C are provided as a source to the user of the application unit and are compiled into the application software by the user without any changes.

"SPI Interface" shows the SPI interface of the integrated communication module and the SPI interface of the application unit, combined to one functional unit.

"2 port Switch driver" refers to the part of the integrated communication unit that operates, controls and configures the switch.

"GOAL" refers to an execution layer in which functions of the field bus protocol are prepared in a software and implemented by the protocol stack. Raw data from the application unit are also received here. It is the middleware. GOAL is an abbreviation for the term Generic Open Abstraction Layer used in the embodiment.

"Communication Protocol"—this software module handles the communication according to the respective field bus standard between the integrated communication unit and a host CPU of an application unit via the SPI interface of both units.

"2-port Switch" refers to a module of the integrated communication unit which connects the two RJ45 interfaces to each other.

"PHY" stands for physical interface and refers to the two RJ45 interfaces of the 2-port module according to the embodiment.

LIST OF REFERENCE NUMERALS 1 housing
2 motherboard
3 RJ45 interface
4 SPI interface
5 opening
6 microcontroller
7 middleware
8 application unit
9 SPI interface of the application unit
10 external control unit
11 further RJ45 interface
12 field bus line
13 field device
14 further communication participant

The invention claimed is:

1. An integrated communication unit, comprising:
a housing, a motherboard, a RJ45 interface, and an SPI (serial peripheral interface), said motherboard and said RJ45 interface being accommodated in said housing, and said housing having at least one opening with a height and width thereof corresponding to the RJ45 standard;
said motherboard including a microcontroller having a middleware, said middleware having a GOAL (generic open abstraction layer), said RJ45 interface providing a cable-based connection to an external control unit, said SPI interface for coupling to a further SPI interface of an application unit, said SPI interface configured for receiving application data of the application unit and providing the application data to said microcontroller by transmission, said microcontroller configured for processing the application data and providing the application data to an external control unit via said RJ45 interface, the integrated communication unit being configured for being mounted on a printed circuit board of the application unit by THT (through-hole technology) or SMT (surface-mounted technology).

2. Integrated communication unit according to claim 1, comprising a second RJ45 interface, said RJ45 interface and said second RJ45 interface being configured for establishing a series connection of the external control unit or a further integrated communication unit to the integrated communication unit.

3. An integrated communication unit, comprising:
a motherboard, at least one RJ45 interface and an SPI (serial peripheral interface);
said motherboard including a microcontroller having a middleware, said middleware having a GOAL (generic open abstraction layer), said RJ45 interface providing a cable-based connection to an external control unit, said SPI interface for coupling to a further SPI interface of an application unit, said SPI interface configured for receiving application data of the application unit and providing the application data to said microcontroller by transmission, said microcontroller configured for processing the application data and providing the application data to an external control unit via said RJ45 interface, the integrated communication unit being configured for being mounted on a printed circuit board of the application unit by THT (through-hole technology) or SMT (surface-mounted technology).

4. Integrated communication unit according to claim 3, comprising a second RJ45 interface, said RJ45 interface and said second RJ45 interface being configured for establishing a series connection of the external control unit or a further integrated communication unit to the integrated communication unit.

* * * * *